United States Patent
Babiel et al.

[11] Patent Number: 5,825,102
[45] Date of Patent: Oct. 20, 1998

[54] FAIL-SAFE CIRCUIT

[75] Inventors: Hartmut Babiel, Rottweil; Konrad Mauch, Dunningen, both of Germany

[73] Assignee: Gebr. Schmidt Fabrik fur Feinmechanik, St. Georgen, Germany

[21] Appl. No.: 878,872

[22] Filed: Jun. 19, 1997

Related U.S. Application Data

[63] Continuation of Ser. No. 421,052, Apr. 12, 1995, abandoned.

[30] Foreign Application Priority Data

Apr. 20, 1994 [DE] Germany .......................... 44 13 637.4

[51] Int. Cl.$^6$ .............................. H02B 1/24; H02H 4/787
[52] U.S. Cl. .......................... 307/127; 307/326; 307/113; 307/116; 307/134; 361/166; 361/195; 361/189
[58] Field of Search ..................... 307/326, 327, 307/328, 112, 113, 119, 116, 139, 134, 127; 361/160, 166, 170, 189, 195

[56] References Cited

U.S. PATENT DOCUMENTS

| | | | |
|---|---|---|---|
| 3,793,533 | 2/1974 | Ginsberg | 307/113 |
| 4,054,935 | 10/1977 | Ginsberg | 361/189 |
| 4,091,438 | 5/1978 | Olding et al. | 361/189 |
| 4,562,359 | 12/1985 | Herzig | 307/113 |
| 5,212,621 | 5/1993 | Panter | 361/181 |

FOREIGN PATENT DOCUMENTS

| | | |
|---|---|---|
| 22 08 816 | 9/1973 | Germany . |
| 36 00 173 A1 | 7/1987 | Germany . |
| 3933699 | 4/1991 | Germany . |

OTHER PUBLICATIONS

German published regulation, No. VDI 2854, Institute For Labour Safety Of The Employer's Liability Insurance Association, St. Augustin, Jun. 1991, 12 pages.

*Primary Examiner*—Jeffrey A. Gaffin
*Assistant Examiner*—Jonathan S. Kaplan
*Attorney, Agent, or Firm*—Harness, Dickey & Pierce, P.L.C.

[57] ABSTRACT

A fail-safe circuit (10) comprises a storage battery (11) for electrical charges as well as a first charge path (12) which optionally connects the storage battery (11) to a first potential (UL). A second charge path (14) and a third charge path (15) optionally connect the storage battery (11) with a second or third potential (UE1, UE2). The first and second switching devices (16, 17), which operate as function of the first and second switching events (TA, TB), each comprise a first and second switching contact (A1, B1) in the first charge path (12) and a second switching contact (A2, B2) in the second and third charge path (14, 15). The actuation coils (LC, LD) of the third and fourth switching devices (18, 19) are in the second and third charge path (14, 15) and each have a first switching contact (C1, D1) in the first charging path (12) and a second contact (C2, C2', D2, D2'). All of the first contacts (A1, B1, C1, D1) in the first charging path (12) are connected in such a way that they only enable a charging of the storage battery (11) from the first potential (UL) in their neutral position. The components in the second and third charging paths (14, 15) are switched in such a way that the second switching contacts (A2, B2) reverse charge the storage battery (11) to the charge potential (UE1, UE2) via the respective actuation coil (LC, LD) in their working position. The second switching contacts (C2, C2', D2, D2') of the third and fourth switching devices (18, 19) are furthermore switched in such a way that a further switching event is only triggered when both switching contacts (C2, C2', D2, D2') are in their working position.

19 Claims, 1 Drawing Sheet

FAIL-SAFE CIRCUIT

This is a continuation of United States patent application Ser. No. 08/421,052, filed Apr. 12, 1995 now abandoned.

BACKGROUND OF THE INVENTION

The present invention relates to a fail-safe circuit which triggers at least one further switching event as a function of a quasi-simultaneity of at least two switching events.

It is expected of such fail-safe circuits that a mechanical and/or electrical failure of one of the circuit's components does not lead to a faulty triggering and/or non-triggering of the further switching event.

They are used wherever certain reactions have to be triggered only if two events occur in very quick succession so as to protect humans and/or machines in everyday working life. If the time interval between the two events is too long the reaction should not take place.

Possible uses for such circuits are for monitoring limit switches, e.g. for sliding tables, floor conveyors, crane trolleys or handling robots, where the simultaneous contact with two extreme positions requires a reaction. Other possible uses are in the field of operator control systems where two switches at separate points distant from one another have to be actuated almost simultaneously. A sort of "coincidence circuit" should ensure that, for example, one operator cannot trigger the reaction on his own, either by pressing the two switches in succession or should one of the switches be jammed, whilst the other operator is still working on the machine to be started.

The Institute for Labour Safety of the Employer's Liability Insurance Association in St. Augustin has published regulations (VDI 2854) on the design of such circuits which specify which types of errors have to be taken into consideration with respect to individual components. Accordingly, the circuit may not show a fault if one of the components used shows a fault which is listed in one of these error lists. The error assumption for manually-operated switches and buttons covers, e.g. the non-closure and/or non-opening of a contact, the non-actuation of the switch due to a mechanical failure or the continued actuation of a switch due to a mechanical failure. In the case of relays it is assumed that they are not released, do not pick up, that the coil or contact path are interrupted, individual contacts do not open or close, etc.

In the case of wire resistors, for example, it is assumed that the amount of resistance can decrease to a short-circuit or increase to an open circuit. A drift between zero and the rated capacity is assumed for capacitors. In the case of semiconductor components it is generally assumed that individual connections can be interrupted or that there is a short-circuit between two random connections. In the case of integrated switching circuits it is further assumed that the complete circuit can fail so that safety signals have to be processed separately in different integrated switching circuits.

SUMMARY OF THE INVENTION

In view of the above it is an object of the present invention to provide a fail-safe circuit which complies with the aforementioned regulations of the Employer's Liability Insurance Association and on the whole calls for an uncomplicated construction.

According to the invention, this problem is solved with the fail-safe circuit mentioned at the outset by providing a joint storage battery for electrical charges for both switching events which is connected to actuation coils of at least two actuating switching devices in such a way that in the event of one or both of the switching events it is reverse charged by one or both actuation coils whereby the switching devices only trigger the other switching event if they are both in their working positions.

A particular advantage of the new circuit is that the time constant during reverse charging of the storage battery is not occasioned by resistors but by the ohmic share or component of the actuation coils. A short circuit or open circuit in the actuation coil in both cases ensures that the corresponding switching device does not trigger so that the risk of faulty switching can be excluded. A slight change in the accompanying ohmic resistance in the actuation coil would also be without consequences since corresponding third and fourth switching devices can then no longer switch.

An error in the storage battery means that the capacity becomes smaller so that the admissible time interval between the two switching events is reduced. However, this cannot lead to a faulty switching but at most to a faulty non-switching, though no objections can be made against this for safety reasons.

An advantage of the new circuit is that only components are used which can be easily monitored or in which the occurrence of the error assumption does no lead to a faulty behaviour of the circuit. If the first and second switching devices are in their neutral positions the storage battery is charged or discharged on the first potential. If either the first or second switching device are not actuated the corresponding switching contact in the first charging path ensures that the storage battery is no longer connected to the first potential. Moreover, the second switching contact ensures that the storage battery is reverse charged on the second or third potential via the corresponding actuation coil of the third or fourth switching device. This reverse charging takes place with a time constant which is determined by the capacity of the storage battery and the ohmic resistance of the actuation coils. The flow of current through the actuation coil ensures that the second contact of the third or fourth switching device is triggered. If the other of the first or second switching devices is now actuated a current also flows through the other actuation coil. Depending on the extent to which the storage battery has been reverse charged, i.e. how much time has passed since the first switching event, this additional current is sufficient to actuate the other of the third or fourth switching devices or not. If the time interval is short enough the other of the third or fourth switching devices is also triggered so that its second switching contact becomes operative. Both second switching contacts of the third and fourth switching device now trigger the further switching event.

The positions of all switching devices in the new circuit are monitored; if, for example, one of the switching devices blocks then either the storage battery is not reverse charged back to the first potential if one of the first switching contacts does not return to its neutral position, or the second switching event is not re-triggered if one of the second switching contacts does not return to its working position.

On the whole it can thus be said that the new circuit fulfills all safely requirements, whereby a particular advantage is the fact that it makes do without semiconductor components such as diodes, transistors or integrated switching circuits an that no ohmic resistance is used whose functions is not monitored. The function of the ohmic resistances in the actuation coils is monitored inasmuch as the corresponding third and fourth switching devices no longer switch when the ohmic resistance changes. A further advantage is the fact that the second and third charging paths so to say block each other since a common storage battery is provided. And finally, another advantage of the new circuit is that it makes do with very few components so that it is inexpensive to construct and is compact.

If the second and third charging potentials are identical the time interval between the two switching events is independent of whether the first switching device or the second switching device was actuated first. However, if the second and third potentials display different values the time intervals are different and depend on whether the first or second switching device was actuated first In general the first potential can be either a ground potential or a service voltage of the new circuit. If the first potential is a ground potential the storage battery is charged on the second or third potential following actuation of the first or second switching device and then discharged to earth when the first and second switching devices are reset. However, the second and third potentials are generally ground potentials so that the first potential carries supply voltage. When the new circuit is in its neutral position the storage battery is then charged to the supply voltage. When the second and third switching devices are then actuated the storage battery is discharged to ground.

It is particularly advantageous if the first and second switching contacts of each switching device are forced to jointly change their switching status and display a compulsory antivalence so that the first switching contact is closed when the second switching contact is open, and vice versa.

The advantage of this is that this prevents not only a hang-up of the switching devices as such but also different behaviours of the individual switching contacts in a switching device. The forced guidance ensures that there is no antivalence for equivalently actuated switching contacts and vice versa. In other words, if one of the switching contacts of a switching device is in its correct position it can be assumed that this is also true of the other switching contact. The only other possibility is that this switching contact is broken.

It is furthermore preferable if the first and second switching devices are designed as safety buttons and the third and fourth switching devices as safety relays.

With such buttons and relays it can be ensured that conductive parts which come loose do not bridge contacts or the insulation between contacts. This is also of assistance in ensuring that the new circuit is very fail-safe.

In a preferential design all of the first switching contacts can be break contacts which are switched in series between the first potential and the storage battery, whereby the second switching contacts of the first and second switching devices can be make contacts which are switched in series with the respective actuation coils.

The advantage of this is that the storage battery is charged when the switching devices are in their neutral position and is only discharged in the working position. A current only flows from the first potential as long as the storage battery is charged. Once the first or second switching device has triggered no more current flows through the first charging path. This has advantages with respect to the power consumption of the new circuit.

The second switching contacts of the third and fourth switching devices can be either make contacts switched in series or break contacts switched parallel.

Further advantages arise from the description and the enclosed drawing.

It is understood that the features mentioned above and those to be explained in the following are applicable not only for the specified combinations but also in other combinations or on their own without going beyond the scope of the present invention.

BRIEF DESCRIPTION OF THE DRAWING

A preferred embodiment of the invention is shown in the drawing and will be described in more detail in the following explanation.

The sole FIGURE shows a schematic diagram of the new circuit.

DESCRIPTION OF THE PREFERRED EMBODIMENT

Figure 1:
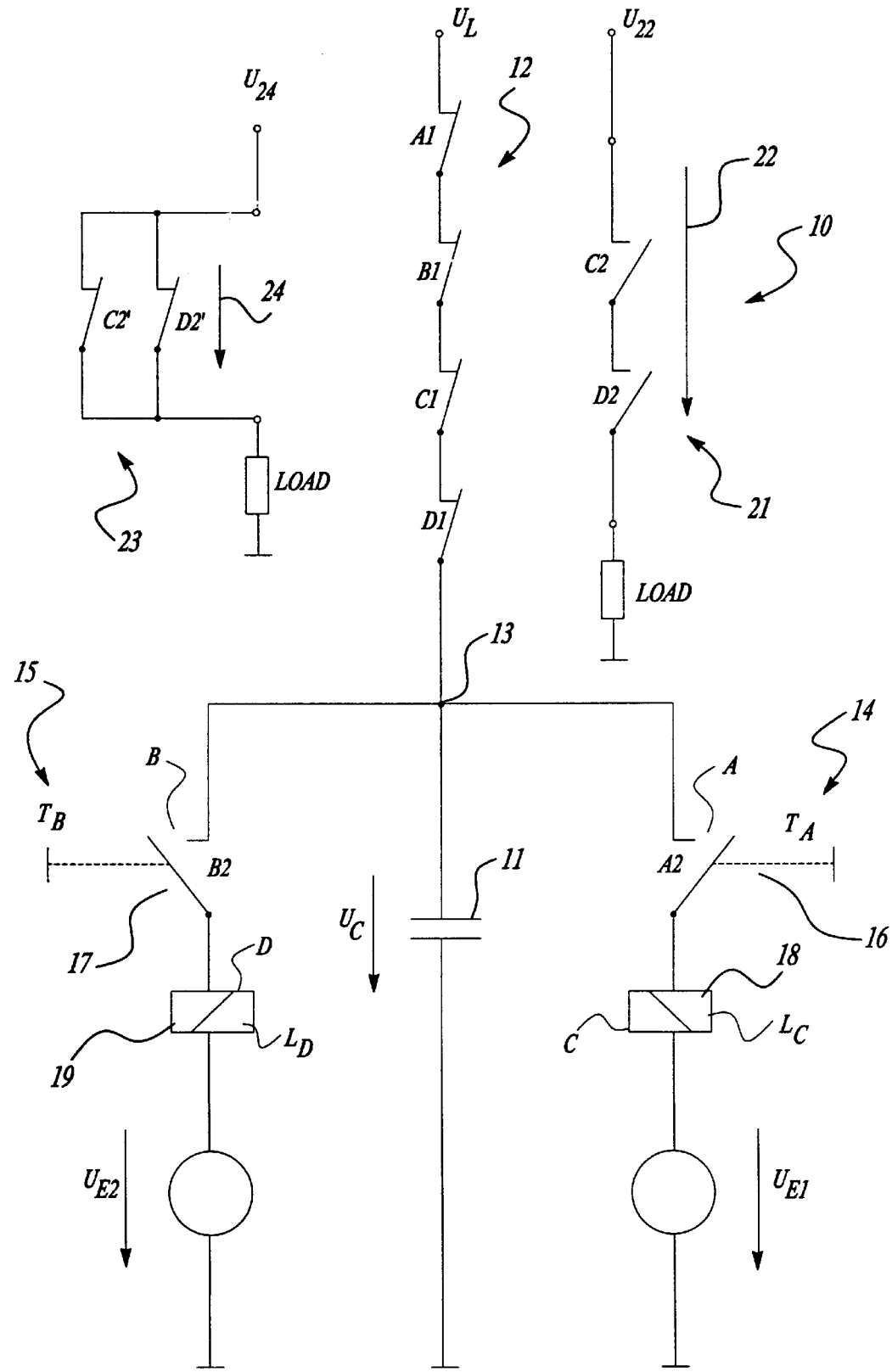

The fail-safe circuit 10 shown in the FIGURE consists of a storage battery 11 in the form of a capacitor. The capacitor 11 is connected to a working voltage UL of the new circuit 10 via a charging path 12. The capacitor 11 is also connected to a first discharge path 14 and a second discharge path 15 at its junction 13 with the charging path 13. The first discharge path 14 is connected to earth via a discharge potential UE1 and the second discharge path 15 is connected to earth via a discharge potential UE2.

The circuit 10 monitors the quasi-simultaneity of two switching events TA and TB. For this purpose it comprises a first switching device 16 in the form of a safety button A, comprising both a break contact A1 in the charging path 12 and a make contact A2 in the first discharge path 14. The safety button A is actuated by the first switching event TA.

A second switching device 17 is also provided in the form of a safety button B which is actuated by the switching event TB and comprises a break contact B1 in the charging path 12 and a make contact B2 in the second discharge path 15.

A third switching device 18 is also provided in the form of a safety relay C whose actuation coil LC is in the first discharge path 14 and which has a break contact C1 in the charging path 12. A fourth switching device 19 in the form of a safety relay D has its actuation coil LD in the second discharge path 15 and a break contact D1 in the charging path 12.

All break contacts A1, B1, C1 and D1 in the charging path 12 are connected in series between the supply voltage UL and the capacitor 11 so that the capacitor 11 is charged by the supply voltage when all four switching devices A, B, C and D are in their neutral position. The make contacts A2 and B2 are in series with the actuation coils LC and LD so that when button A or B between the capacitor 11 and the discharge potentials UE1 or UE2 closes an equalising current flows through the actuation coils LC and LD. If this equalising current is high enough the safety relay C or D picks up. The third and fourth switching devices 18, 19 also have two switching contacts which can be designed as series make contacts C2, D2 or as parallel break contacts C2', D2'. Numeral 21 indicates a load circuit for the new circuit 10 which connects a voltage 22 if both make contacts C2 and D2 are closed. Alternatively a load circuit 23 can be provided which disconnects a voltage 24 if both break contacts C2' and D2' are actuated.

Since the first, second, third and fourth switching devices 16, 17, 18 and 19 are designed as safety buttons A, B and safety relays C, D, respectively, there is a compulsory antivalence and equivalence for all switching devices between the first switching contacts A1, B1, C1, D1 and the second switching contacts A2, B2, C2, D2; C2', D2'. In other words the first switching contacts A1, B1, C1, D1 are only in their neutral position when the second switching contacts A2, B2, C2, D2; C2', D2'are in their neutral position. The same applies for the working positions of all switching contacts.

The new circuit 10 functions a follows:

In the neutral position, when both switching events TA and TB have not yet occurred, the capacitor 11 is charged to supply voltage UL through a series connection of the break contacts A1, B1, C1, D1. If one of the four switching devices A, B, C, D should hang-up in its working position during the last switching change the corresponding break contact would not be closed so that the capacitor 11 would not be charged.

If one of the two switching events TA, TB is now triggered, the button A, B is actuated. It is assumed that this is button A.

Through the closure of button A the break contact A1 opens whereas the make contact A2 closes. This firstly disconnects the capacitor 11 from the supply voltage UL and also discharges this against potential UE1 via the coil LC. For simplicity's sake it is assumed in the following that the voltages UE1 and UE2 are short-circuited so that the actuation coils LC and LD are connected to ground directly.

The capacitor now discharges itself against ground via the actuation coil LC. The current flowing through the actuation coil LC is sufficient to switch the safety relay C so that the break contact Cl opens and the second contact C2, C2' is also actuated. This discharging of the capacitor 11 takes place with a time constant which is determined by the capacity of the capacitor 11 and the internal ohmic resistance of the actuation coil LC. The discharging of the capacitor 11 takes place according to the known exponential function so that the voltage UC decreases over time.

At the end of a certain time interval, during which the voltage UC has dropped to a certain value below UL, the second switching event TB occurs. The second safety button B switches so that the break contact B1 opens and the make contact B2 closes. The capacitor is now also discharged in parallel via the actuation coil LD in the second discharge path 15. If the voltage UC and the charge in the capacitor 11 are sufficiently high at this point in time the current flowing through the actuation coil LD is now sufficient to switch the second safety relay 19. This means that not only does break contact D1 open, but the second switching contact D2, D2' also switches so that the load circuits 21 or 23 trigger the further switching event.

However, if the time interval between the first switching event TA and the second switching event TB was too long, in other words the voltage UC or the charge had dropped below a critical value, the discharge current of the capacitor 11 is insufficient to excite the actuation coil LD to switch the second safety relay D. The time interval within which both switching events TA and TB must have taken place so that the load circuits 21 and 23 trigger the further switching event can thus be determined through the choice of the capacity of the capacitor 11 and the specified internal resistance of the actuation coils LC and LD.

Thanks to the forced antivalence and equivalence of the switching devices A, B, C and D it can be ensured that should one of the switching devices A, B, C or D hang-up or one of the switching contacts break, either the capacitor 11 is no longer charged or a discharge of the capacitor 11 via both discharge paths 14, 15 is no longer possible. Through the arrangement of the second switching contacts C2, D2; C2', D2' of the third and fourth switching devices 18 and 19 in the load circuits 21 and 23 it is also ensured that a further switching event is only triggered when both safety relays C and D have picked up.

With a specified maximum time interval which may pass between the two switching events TA and TB the capacitor 11 is selected with respect to its nominal capacity in such a way that the actual admissible time interval resulting from this nominal capacity and the internal resistance of the actuation coils LC and LD exactly corresponds to the maximum admissible time interval.

Problems are not to be expected with respect to the internal ohmic resistance of the actuation coils LC and LD in connection with the specified time interval. However, if purely ohmic resistances were to be provided in place of the actuation coils LC, LD a considerable increase in the resistances would have to be regarded as an error assumption so that the time constants and thus the present time interval could vary over a number of orders of magnitude so that the maximum time interval would be significantly exceeded.

In the event of a drift in the internal resistances of the actuation coils LC, LD this error status is, however, monitored inasmuch as the safety relays C, D no longer respond if the internal ohmic resistance changes. In other words, a change in ohmic resistances is not excluded with the new circuit 10 either, though this change does not lead to an extension of the present time interval which may pass between the two switching events TA and TB but prevents a faulty triggering of the further switching event inasmuch as the safety relay C or D does not pick up through this change in resistance.

Therefore, what is claimed, is:

1. A fail-safe circuit which triggers at least one reaction of a load as a function of a quasi-simultaneity of at least two switching events, comprising a single capacitive storage means for electrical charges, wherein said storage means is connected to actuation coils of at least two actuating switching devices in such a way that in the event of one or both of the switching events the storage means is reverse charged by one or both actuation coils, whereby the switching devices only trigger the reaction of said load if both switching devices are in their working position,comprising:

a first charging path which connects the storage means to a first potential, a second charging path which connects the storage means to a second potential, at least a third charging path which connects the storage means to a third potential, a first switching device which operates as a function of the first switching event and which has a first switching contact in the first charging path and a second switching contact in the second switching path, and at least a second switching device which operates as a function of the second switching event and which has a first switching contact in the first charging path and a second switching contact in the third switching path, whereby:

a further triggering switching device is located as a third switching device with its actuation coil in the second charging path and has a first switching contact in the first charging path and a second switching contact, a still further triggering switching device is located as a fourth switching device with its actuation coil in the third charging path and has a first switching contact in the first charging path and a second switching contact, all of the first switching contacts in the first charging path are interconnected in series to only allow charging of the capacitive storage means to the first potential if all of them are in their neutral position, the actuation coils of the third and fourth switching devices and the second switching contacts of the first and second switching devices are interconnected in series in their respective second and third charging paths to reverse charge the storage means when the second switching contacts are in their working position, and the second switching contacts of the third and fourth switching devices are connected between a supply voltage and a load in such a way that the reaction of the load is only triggered in response to the energization of both actuation coils.

2. Circuit in accordance with claim 1, wherein the second and third potentials are identical.

3. Circuit in accordance with claim 2, wherein the second and third potentials are connected to earth potentials and the first potential corresponds to a supply voltage of the circuit.

4. Circuit in accordance with claim 1, wherein the first and second switching contacts of each switching device are forced to jointly change their switching status.

5. Circuit in accordance with claim 1, wherein first and second switching contacts of each switching device display a compulsory antivalence so that the first switching contact is closed when the second switching contact is open, and vice versa.

6. Circuit in accordance with claim 1, wherein the first and second switching devices are safety buttons.

7. Circuit in accordance with claim 1, wherein the third and fourth switching devices are safety relays.

8. A fail-safe control circuit for controlling the operation of a load in response to the occurrence of two substantially simultaneous switching events, said control circuit including a capacitive storage device adapted to be charged via a charging path connecting said capacitive storage device to a first potential, a first discharge path connecting said capacitive storage device to a second potential lower than said first potential and comprising a first actuation coil having associated therewith an ohmic resistance value and a first switching device which operates as a function of said first switching event to enable said capacitive storage device to discharge through said first actuation coil, a second discharge path in parallel with said first discharge path and connecting said capacitive storage device to a third potential lower than said first potential, and comprising a second actuation coil having associated therewith an ohmic resistance value and a second switching device which operates as a function of said second switching event to enable said capacitive storage device to discharge through said second actuation coil, said first and second actuation coils having operatively associated therewith third and fourth switching devices, respectively, connected in circuit with the load for controlling the operation of the load in response to the energization of both said first and second actuation coils, and fifth switching means connected in said charging path for disconnecting said capacitive storage device from said first potential in response to the occurrence of either of said first and second switching events, whereby in response to the substantially simultaneous occurrence of said first and second switching events, said first and second actuation coils are energized by the discharge of said capacitive storage device through said first and second discharge paths to thereby operate the load, and further wherein the rate of discharge of said capacitive storage device through said first and second discharge paths is determined substantially exclusively by the capacitive value of said storage device and the ohmic resistance values of said first and second relay coils.

9. The fail-safe circuit of claim 8 wherein said fifth switching means comprises sixth and seventh normally closed switching devices connected in series between said first potential and said capacitive storage device and operatively responsive to said first and second switching events, respectively.

10. The fail-safe circuit of claim 9 further including eighth and ninth normally closed switching devices connected in said charging path in series with said sixth and seventh switching devices between said first potential and said capacitive storage device and operatively responsive to energization of said first and second actuation coils, respectively, to disconnect said capacitive storage device from said first potential.

11. The fail-safe circuit of claim 9 wherein said fifth switching means comprises sixth and seventh normally closed switching devices connected in series between said first potential and said capacitive storage device and operatively responsive to energization of said first and second actuation coils, respectively.

12. The fail-safe circuit of claim 8 wherein said second and third potentials are substantially equal to ground potential.

13. The fail-safe circuit of claim 12 wherein said first potential corresponds to a supply voltage of the circuit.

14. The fail-safe circuit of claim 8 wherein the rate of discharge of said capacitive storage device through either of said first and second discharge paths is sufficient to prevent energization of one of said first and second actuation coils if one of said first and second switching events does not occur within a predetermined brief time period of the occurrence of the other of said first and second switching events.

15. The fail-safe circuit of claim 9 wherein said first and sixth switching devices and said second and seventh switching devices, respectively, display a compulsory antivalence so that said first and second switching devices are open when said sixth and seventh switching devices are closed, and vice versa.

16. The fail-safe circuit of claim 9 wherein said first switching device comprises a normally open pair of switch contacts and said sixth switching device comprises a normally closed pair of switch contacts, and further wherein said first and sixth switching devices are operatively interconnected to jointly change their switching status in response to said first switching event.

17. The fail-safe circuit of claim 16 wherein said first and sixth switching devices are mechanically interconnected and comprise a pushbutton-type switch.

18. The fail-safe circuit of claim 9 wherein said second switching device comprises a normally open pair of switch contacts and said seventh switching device comprises a normally closed pair of switch contacts, and further wherein said second and seventh switching devices are operatively interconnected to jointly change their switching status in response to said second switching event.

19. The fail-safe circuit of claim 18 wherein said second and seventh switching devices are mechanically interconnected and comprise a pushbutton-type switch.

* * * * *